(12) United States Patent
Victor et al.

(10) Patent No.: US 9,702,542 B2
(45) Date of Patent: Jul. 11, 2017

(54) METHODS AND APPARATUS FOR POWER RECOVERY IN FLUID CATALYTIC CRACKING SYSTEMS

(71) Applicant: UOP LLC, Des Plaines, IL (US)

(72) Inventors: Sanford Allan Victor, Buffalo Grove, IL (US); Richard A. Johnson, II, Algonquin, IL (US); Xin X. Zhu, Long Grove, IL (US)

(73) Assignee: UOP LLC, Des Plaines, IL (US)

(*) Notice: Subject to any disclaimer, the term of this patent is extended or adjusted under 35 U.S.C. 154(b) by 330 days.

(21) Appl. No.: 14/520,523

(22) Filed: Oct. 22, 2014

(65) Prior Publication Data

US 2016/0116156 A1 Apr. 28, 2016

(51) Int. Cl.
| | |
|---|---|
| *F22B 1/18* | (2006.01) |
| *C10G 11/18* | (2006.01) |
| *F02C 7/10* | (2006.01) |
| *F01K 11/02* | (2006.01) |
| *F01K 23/06* | (2006.01) |
| *F02C 1/06* | (2006.01) |
| *F02C 3/20* | (2006.01) |

(52) U.S. Cl.
CPC ............ *F22B 1/18* (2013.01); *C10G 11/182* (2013.01); *F01K 11/02* (2013.01); *F01K 23/061* (2013.01); *F02C 1/06* (2013.01); *F02C 3/205* (2013.01); *F02C 7/10* (2013.01); *F05D 2220/62* (2013.01); *Y02E 20/14* (2013.01); *Y02E 20/16* (2013.01); *Y02E 20/18* (2013.01)

(58) Field of Classification Search
CPC ...... F22B 1/18; F02C 7/10; F02C 1/06; F02C 3/205; C10G 11/182; F01K 23/061; F01K 11/02; Y02E 20/18; Y02E 20/16; Y02E 20/14

USPC ............ 60/39.182, 39.511, 777, 723, 39.822
See application file for complete search history.

(56) References Cited

U.S. PATENT DOCUMENTS

| | | | | |
|---|---|---|---|---|
| 5,248,408 A | * | 9/1993 | Owen | ............. B01J 8/0055 208/113 |
| 5,469,698 A | | 11/1995 | Mallol | |

(Continued)

FOREIGN PATENT DOCUMENTS

EP 113380 A1 7/1984

OTHER PUBLICATIONS

Carbonetto et al., New Designs and Applications for Increased Power Recovery and Improved Reliability in FCC Expanders, Proceedings of the 31st Turbo Machinery Symposium; Turbomachinery Laboratory, Texas A&M University 2002.

*Primary Examiner* — Hoang Nguyen (57) ABSTRACT

A co-generation process for a regenerator in an FCC system having a reactor and a regenerator includes the steps of introducing flue gas from the regenerator into a heating unit at a first location of the heating unit, and introducing an oxygen/fuel gas mixture into the heating unit at a second location of the heating unit apart from the first location, and combusting the oxygen/fuel gas mixture in the heating unit at the second location to form a hot combustion gas. The process further includes the steps of combining the hot combustion gas and the flue gas at a third location of the heating unit apart from the first location to produce heated flue gas, heating water and/or steam with the heated flue gas to produce a heated steam, and introducing the heated steam into a turbine to extract energy from the heated steam.

20 Claims, 5 Drawing Sheets

(56) References Cited

U.S. PATENT DOCUMENTS

| | | |
|---|---|---|
| 5,666,801 A | 9/1997 | Rhorer |
| 5,705,053 A * | 1/1998 | Buchanan ............ C10G 11/182 |
| | | 208/113 |
| 7,622,033 B1 | 11/2009 | McGhee |
| 7,682,576 B2 | 3/2010 | Zhu et al. |
| 7,686,944 B2 | 3/2010 | Zhu et al. |
| 7,802,435 B2 | 9/2010 | McGhee |
| 2006/0266048 A1 * | 11/2006 | Bell ...................... F01K 23/067 |
| | | 60/783 |
| 2007/0209367 A1 * | 9/2007 | Bell ....................... F01K 23/16 |
| | | 60/775 |

* cited by examiner

METHODS AND APPARATUS FOR POWER RECOVERY IN FLUID CATALYTIC CRACKING SYSTEMS

TECHNICAL FIELD

The present disclosure generally relates to methods and apparatus for processing hydrocarbons in fluid catalytic cracking (FCC) systems. More particularly, the present disclosure relates to methods and apparatus for power recover in FCC systems.

BACKGROUND

The fluidized catalytic cracking of hydrocarbons is the mainstay process for the production of gasoline and light hydrocarbon products from heavy hydrocarbon charge stocks such as vacuum gas oils or residual feeds. Large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons include a reactor, a regenerator, and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium.

The FCC process is carried out by contacting the starting material—generally vacuum gas oil, reduced crude, or another source of relatively high boiling hydrocarbons—with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. The cracking reaction deposits coke on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes of removing the coke by oxidation with an oxygen-containing gas. An inventory of catalyst having a reduced coke content relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

Refining companies are under increased pressure to reduce $CO_2$ emissions as a result of carbon tax legislation and other drivers such as a desire to demonstrate long-term sustainability. One way of reducing overall $CO_2$ emissions is by improving the energy efficiency of the process. Thus, there is a need to provide a way to improve the overall energy efficiency of a fluid catalytic cracking unit. In order to achieve this end, some prior art systems have proposed recovering power from the hot flue gas. With traditional FCC power recovery technology, however, there are current limitations to increase the FCC flue gas temperature and flowrate using the flue gas power recovery arrangement in which a third stage separator is followed by a power recovery expander. The temperature at the inlet to the expander is restricted by the temperature limit of the FCC catalyst and the regenerator, which determines the expander conditions. Thus current technology is limited on the amount of power that can be produced in the FCC power recovery expander.

In commonly-assigned U.S. Pat. No. 7,802,435, a new flow scheme was proposed by James F. McGehee, which is to install a combustor in the front of turbine expander. The combustor and the expander are separate equipment. By combusting the FCC regenerator flue gas in the combustor, the flue gas temperature can be increased at least 900° C. Heated flue gas enters the expander first and then goes to the steam generator downstream. At the same time, flue gas flow rate increases significantly due to air and fuel added in the combustor. The direct consequence is increased power generation from the turbine expander. Although McGehee's patent aims to increase power recovery, steam generation can be increased as well due to much increased heat content of the flue gas via increased flue temperature and flowrate.

The combustor used in such power recovery applications should be innovated for its placement in front of the expander. To date, the prior art is devoid of any combustor designs that are specially adapted for use in FCC power recovery applications. In other words, a special combustor design is desirably obtained in order for practical applications of the concept of installing a combustor before the expander. The described embodiments of present disclosure aim to meet at least this need. Furthermore, other desirable features and characteristics of the described embodiments will become apparent from the subsequent detailed description and the appended claims, taken in conjunction with the accompanying drawings and this background.

BRIEF SUMMARY

Methods and apparatus for power recover in FCC systems are provided. More particularly, the embodiments provided herein improve the energy efficiency of the FCC and provide for co-generation of electric/mechanical power at high cycle efficiency. In an exemplary embodiment, a co-generation process for a regenerator in an FCC system having a reactor and a regenerator includes the steps of introducing flue gas from the regenerator into a heating unit at a first location of the heating unit, and introducing an oxygen/fuel gas mixture into the heating unit at a second location of the heating unit apart from the first location, and combusting the oxygen/fuel gas mixture in the heating unit at the second location to form a hot combustion gas. The process further includes the steps of combining the hot combustion gas and the flue gas at a third location of the heating unit apart from the first location to produce heated flue gas, heating water and/or steam with the heated flue gas to produce a heated steam, and introducing the heated steam into a turbine to extract energy from the heated steam.

In another exemplary embodiment, a co-generation apparatus for a regenerator in a fluidized catalytic cracking (FCC) system having a reactor and a regenerator includes a heating unit, in fluid communication with flue gas from the regenerator, that comprises first, second, and third locations, wherein the second and third locations are positioned apart from the first location, wherein the heating unit receives a flue gas from the regenerator at the first location, an oxygen/fuel gas mixture at the second location which, when combusted forms a hot combustion gas, and wherein the heating unit combines the flue gas and the hot combustion gas at the third location to form a heated flue gas. The apparatus further includes a water or steam source, a heat exchanger in fluid communication with the heating unit and the water or steam source that heats the water or steam source with the heated flue gas stream to form a heated steam, and a steam turbine in fluid communication with the heated steam from the heat exchanger, wherein the steam turbine is configured to generate energy upon entry of the heated steam therein.

In yet another exemplary embodiment, a co-generation process for a regenerator in a fluidized catalytic cracking (FCC) system having a reactor and a regenerator includes the steps of introducing flue gas from the regenerator into a combustion unit at a first location of the combustion unit, and introducing an air/fuel gas mixture into the combustion unit at a second location of the combustion unit apart from the first location, combusting the air/fuel gas mixture in the combustion unit at the second location to form a hot combustion gas, and combining the hot combustion gas and the flue gas at a third location of the combustion unit apart from the first location to produce heated flue gas at a temperature of at least about 875° C. (about 1600° F.). The process further includes the steps of expanding the heated flue gas in an expander to form an expanded, heated flue gas, wherein the expander generates electrical energy, heating water or steam with the expanded, heated flue gas to produce a heated steam at a pressure of at least about 2.75 MPa (about 27.5 bar), and introducing the heated steam into a turbine to extract energy in the form of mechanical or electrical energy from the heated steam.

BRIEF DESCRIPTION OF THE DRAWINGS

Various embodiments will hereinafter be described in conjunction with the following drawing figures, wherein like numerals denote like elements, and wherein.

DETAILED DESCRIPTION

The following detailed description is merely exemplary in nature and is not intended to limit the application and uses of the embodiment described. Furthermore, there is no intention to be bound by any theory presented in the preceding background or the following detailed description.

The various embodiments described herein relate to methods and apparatus for power recover in FCC systems are provided. More particularly, the embodiments provided herein improve the energy efficiency of the FCC and provide for co-generation of electric/mechanical power at high cycle efficiency. For typical FCC regenerators, flue gas contains carbon monoxide (CO) that has not yet been converted to $CO_2$ for release into the atmosphere. The embodiments described herein feature installing a combustion chamber in front of a turbine expander. The supplementary fuel is used to increase the temperature for reaction and additional air is added to combust the fuel and react CO to $CO_2$, as well as to adjust steam generation in the FCC. This combustion chamber can increase the flue gas temperature from the typical range of about 1200 to about 1400° F. (about 650 to about 760° C.) to a new range between about 1600 and about 2500° F. (about 875 to about 1375° C.). A variety of gaseous and clean liquid fuels can be used as supplementary fuel such as natural gas, FCC dry gas, compressed PSA tail gas and refinery fuel gas. Liquid fuel in the diesel range can also be used.

The embodiments provided herein also disclose novel combustor designs that are particularly suited for use in front of a turbine expander, as described above. The design of the combustor desirably accomplishes the injection of fuel and air while providing mixing of these gases with the flue gases flowing towards the expander. The present disclosure provides various designs for such use. For example, in accordance with some embodiments, a combustor is provided wherein the flue gases enter the combustor annularly around the combustion air and fuel. This allows for flame stability as the large flue gas flow mixes downstream of the combustion process. In accordance with other embodiments, the combustor may include a burner located in a combustion air duct which later mixes with the flue gas duct providing a more streamlined mixing of the two streams. This design is simply a burner in a duct containing a large air flow but is segregated from the flue gases to provide for better combustion stability. In accordance with further embodiments, the combustor may include a flue gas duct with two separate injections of air and fuel. At the expansion of the duct diameter, a ring of air piping surrounds the flue gas duct. A number of pipes direct the air from the ring to distribute the combustion air into the mixture. A static mixer (such as a perforated plate) may be used to obtain better uniformity of flow. A second ring system injecting the fuel into the ductwork follows. The ring has angular plates to stabilize the flames on the rings. Multiple internal rings are used to disperse the fuel across the flue gas/air mixture. These rings have multiple holes for the fuel to be injected into the stream. The distribution of the combustion process will allow for a shorter length of duct for the fluids to mix, allowing this combustor to be closer to the expander.

Figure 1:
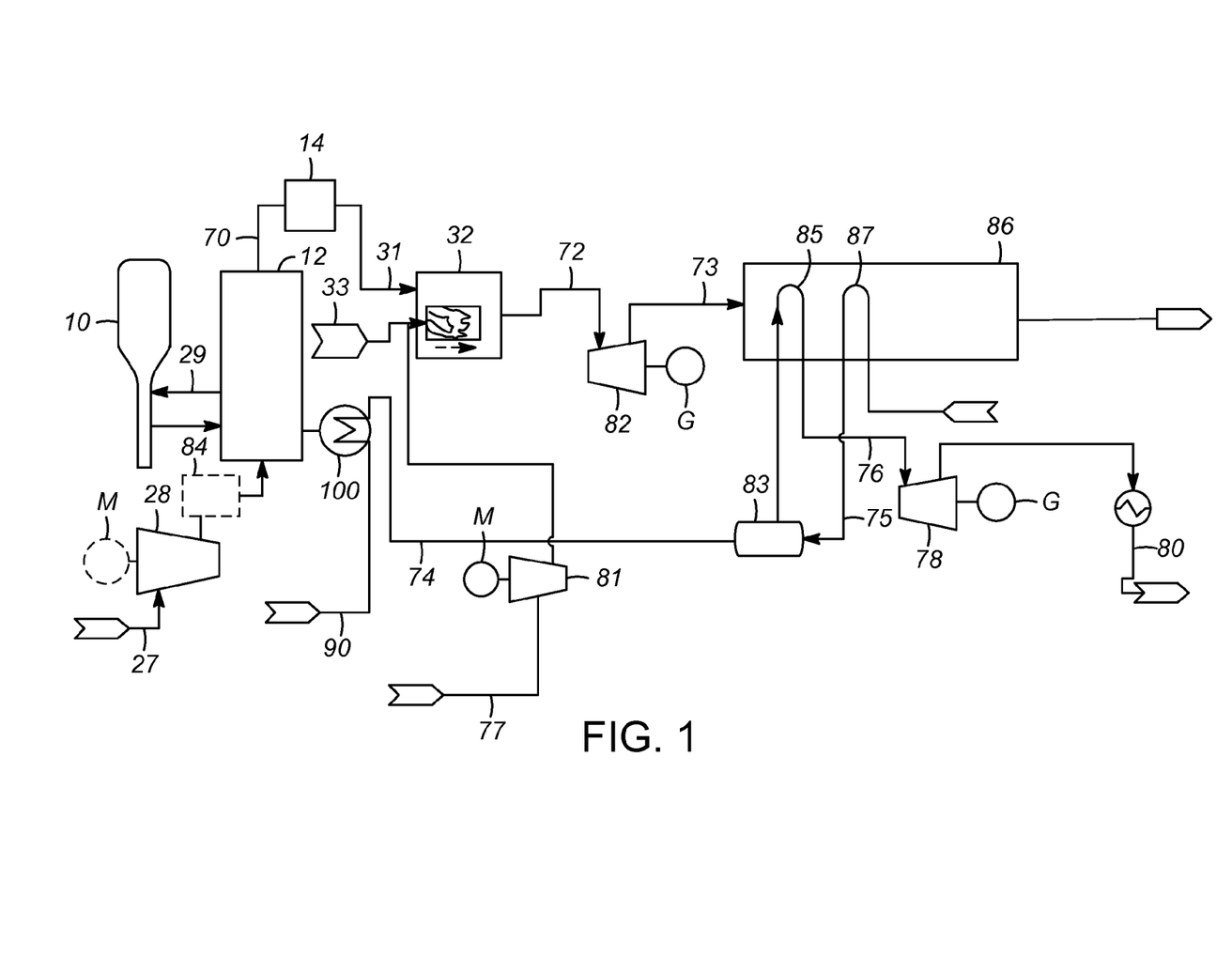
FIG. 1 shows an exemplary fluidized catalytic cracking process with which the power recovery processes and apparatus of the present disclosure may be implemented.

The various embodiments of the present disclosure are now described in greater detail with regard to the Figures. The embodiments of the present disclosure utilize a cogeneration process to heat the flue gas from the regenerator 12 to produce electricity at high efficiency. FIG. 1 shows an exemplary fluidized catalytic cracking process with which the power recovery processes and apparatus of the present disclosure may be implemented. The FCC system includes a reactor 10 and a regenerator 12. Air 27 is introduced into the reactor via blower 28. The reactor 10 cracks a hydrocarbon feed into simpler molecules through contact with a catalyst. The regenerator 12 oxidizes coke from the catalyst. The regenerator 12 may, but does not necessarily, include an optional catalyst cooler 100, which controls the temperature of the catalyst in the regenerator by cooling it with a steam loop. The flue gas exits the regenerator 12 and is optionally treated at a third-stage separator 14, which removes fine particles from the flue gas. The flue gas is introduced into an expander 82 to recover some of the energy of the flue gas as electricity or as mechanical energy. Further heat may be recovered from the flue gas via waste heat steam generator 86. The process also includes a heating unit 32. A heating unit 32 increases the temperature of the flue gas from the regenerator 12. Electricity (or other energy, such as mechanical energy) is produced in steam turbine 78.

The regenerator 12 includes a flue gas stream 70. The flue gas stream 70 typically includes as primary components $CO_2$, $N_2$, $H_2O$, and CO and has a temperature of about 700° C. (1300° F.) to about 760° C. (1400° F.). The flue gas stream 70 is introduced into the heating unit 32 to produce a heated flue gas stream 72. The heating unit 32 heats the flue gas to a high temperature, preferably of at least about 875° C. (1600° F.), more preferably at least about 1000° C. (1830° F.), most preferably at least about 1100° C. (2010° F.). Combustion air blower 81 provides filtered air 77 to heater or combustor 32. Fuel gas 33 is also provided to combustor 32.

The embodiments provided herein also disclose novel combustor 32 designs that are particularly suited for use in front of a turbine expander, as described above. The design of the combustor desirably accomplishes the injection of fuel and air while providing mixing of these gases with the flue gases flowing towards the expander. Each of the combustor embodiments described herein operate according to the following principle of operation: introducing flue gas 70 from the regenerator 12 into the combustor 32 at a first location of the combustor 32, and introducing an oxygen 77/fuel gas 33 mixture into the combustor 32 at a second location of the combustor 32 apart from the first location, combusting the oxygen 77/fuel gas 33 mixture in the combustor at the second location to form a hot combustion gas, and combining the hot combustion gas and the flue gas 70 at a third location of the combustor apart from the first location to produce heated flue gas 73.

Figure 2:
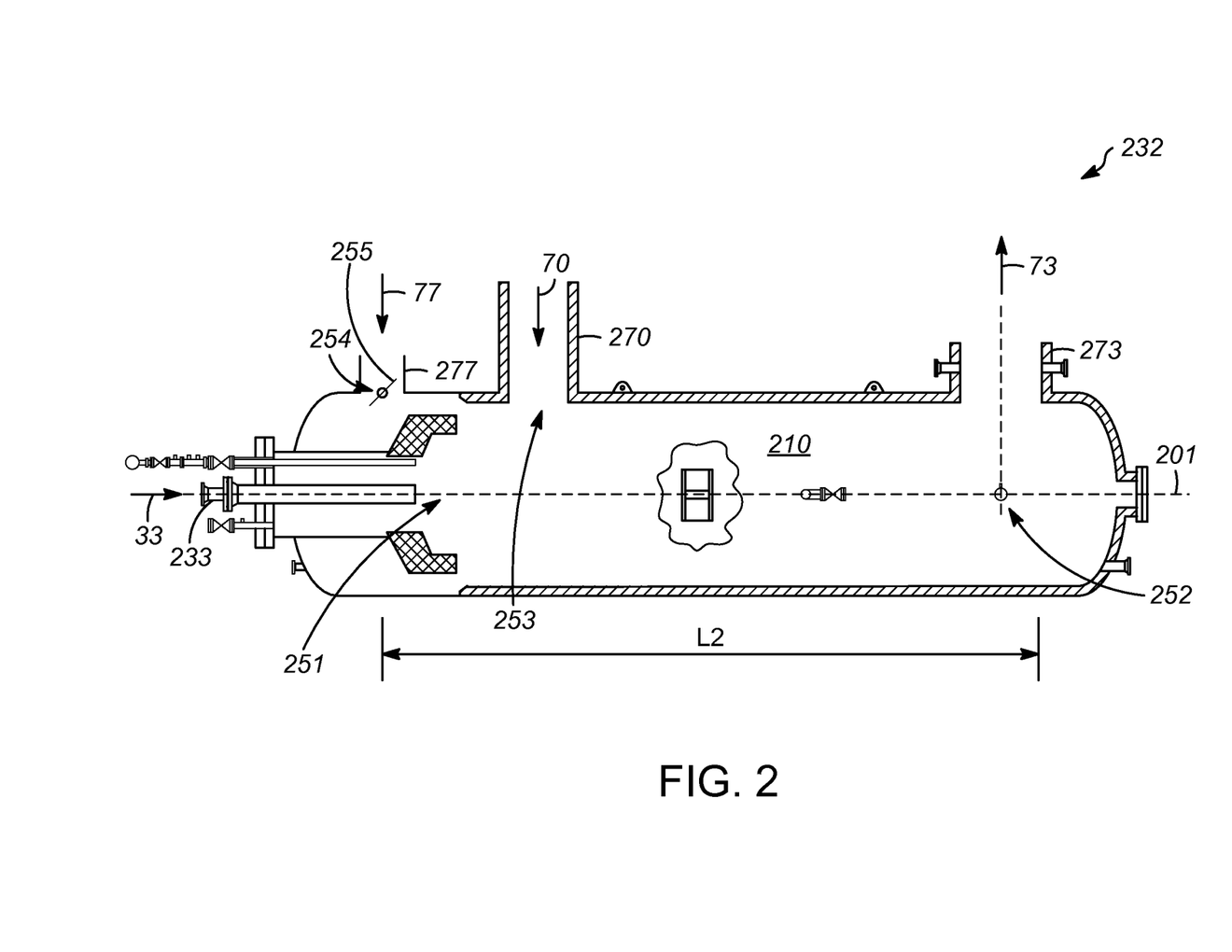
FIGS. 2-3 provide exemplary configurations of combustors suitable for use in the fluidized catalytic cracking process illustrated in FIG. 1.

In accordance with one exemplary embodiment, as shown in FIG. 2, a combustor 232 is provided. In this embodiment, combining the hot combustion gas and the flue gas at the third location comprises combining at a third location that is apart from the second location. The combustor 232 is configured such that the flue gases 70 enter the combustor 232 at location 253 around the combustion air and fuel. This allows for flame stability as the large flue gas flow mixes downstream of the combustion process. Accordingly, combustor 232 includes a fuel gas inlet 233 wherein fuel gas 33 enters the combustor 232. The combustor 232 further includes an air inlet 277 wherein air/oxygen 77 enters the combustor 232. A combustion zone 210 extends within the combustor 232 for a length L2. Combustion initiates near a first end of the combustion zone 210 wherein the fuel gas 33 and air 77 are brought together to form combustion gasses. Fuel gas 33 may enter in a longitudinal direction along longitudinal axis 201 of the combustor 232 at a position 251 and continue longitudinally the length L2 through the combustion zone. The air 77 may enter longitudinally upstream from the fuel gas 33 at a longitudinal position 254, and may enter from a direction perpendicular to the longitudinal axis 201. A damper 255 is used to divide the air between the portion entering the combustion zone 210 axially around the fuel 233 and annularly around the burner stabilizer at location 251. The flue gas 70 enters the combustor 232 through a flue gas inlet 270, which is located at longitudinal position 253 that is downstream in the combustion section 210 from both the fuel gas inlet position 251 and the air inlet position 254, and may also enter from a direction perpendicular to the longitudinal axis 201. Combustion of the air 77 and the fuel gas 33 occurs along length L2 within the combustion zone 210 to produce combustion gasses, i.e. $CO_2$ and $H_2O$. The mixture of combustion gasses and the flue gas, now heated via the combustion and referred to herein as a heated flue gas 73, continues longitudinally in the combustion zone 210 until position 252 is reached, at which the heated flue gas 73 exits via outlet 273.

Figure 3:
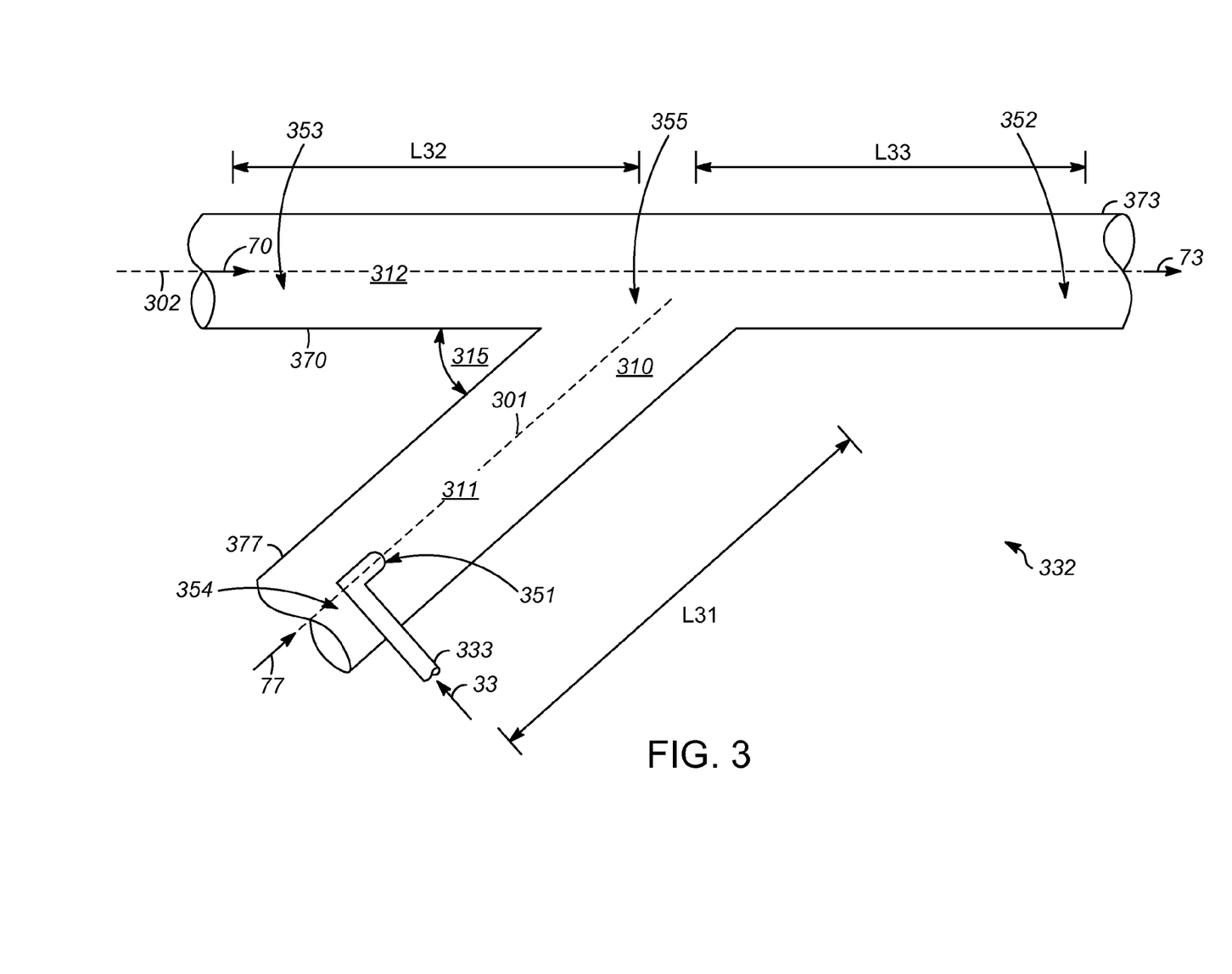

In accordance with another exemplary embodiment, as shown in FIG. 3, a combustor 332 is provided. In this embodiment, combining the hot combustion gas and the flue gas at the third location comprises combining at a third location that is apart from the second location. The combustor 332 is configured such that the combustor may include a burner located in a combustion air duct which later mixes with the flue gas duct providing a more streamlined mixing of the two streams. This design is simply a burner in a duct containing a large air flow but is segregated from the flue gases to provide for better combustion stability. Accordingly, combustor 332 includes a fuel gas inlet 333 in a combustion air duct 311 (having length L31) wherein fuel gas 33 enters the combustor 332. The combustor 332 further includes an air inlet 377 wherein air/oxygen 77 enters the combustor 332, also positioned in the combustion air duct. A combustion zone 310 extends within the combustor 332. Combustion initiates near a first end 351 of the combustion air duct wherein the fuel gas 33 and air 77 are brought together to form combustion gasses. Fuel gas 33 may enter in a longitudinal direction along longitudinal axis 301 of the combustor 332 at a position 351 and continue longitudinally the length L31 through the combustion air duct 311. The air 77 may enter longitudinally upstream from the fuel gas 33 at a longitudinal position 354, and may enter from a direction parallel to the longitudinal axis 301. The flue gas 70 enters the combustor 332 through a flue gas inlet 370, which is located at longitudinal position 353 in flue gas duct 312, and may enter at an angle 315 with respect to the longitudinal axis 301. Accordingly, a second longitudinal axis 302 is defined within the flue gas duct 312, and axis 301, 302 are disposed at the angle 315 with regard to one another, which may be from about 0 degrees to about 90 degree, for example about 30 degrees as shown in FIG. 3. The flue gas duct 312 has length L32 through which the air 77 travels until point 355 is reached, at which the hot combustion gasses and the air 77 meet and mix with one another. Combustion of the air 77 and the fuel gas 33 occurs along length L31 within the combustion zone 310 to produce combustion gasses, i.e. $CO_2$ and $H_2O$. The mixture of combustion gasses and the flue gas, now heated via the combustion and referred to herein as a heated flue gas 73, continues longitudinally in the combustion zone 310 along axis 302 and past point 355 until position 352 is reached (i.e., length L33), at which the heated flue gas 73 exits via outlet 373.

Figure 4A:
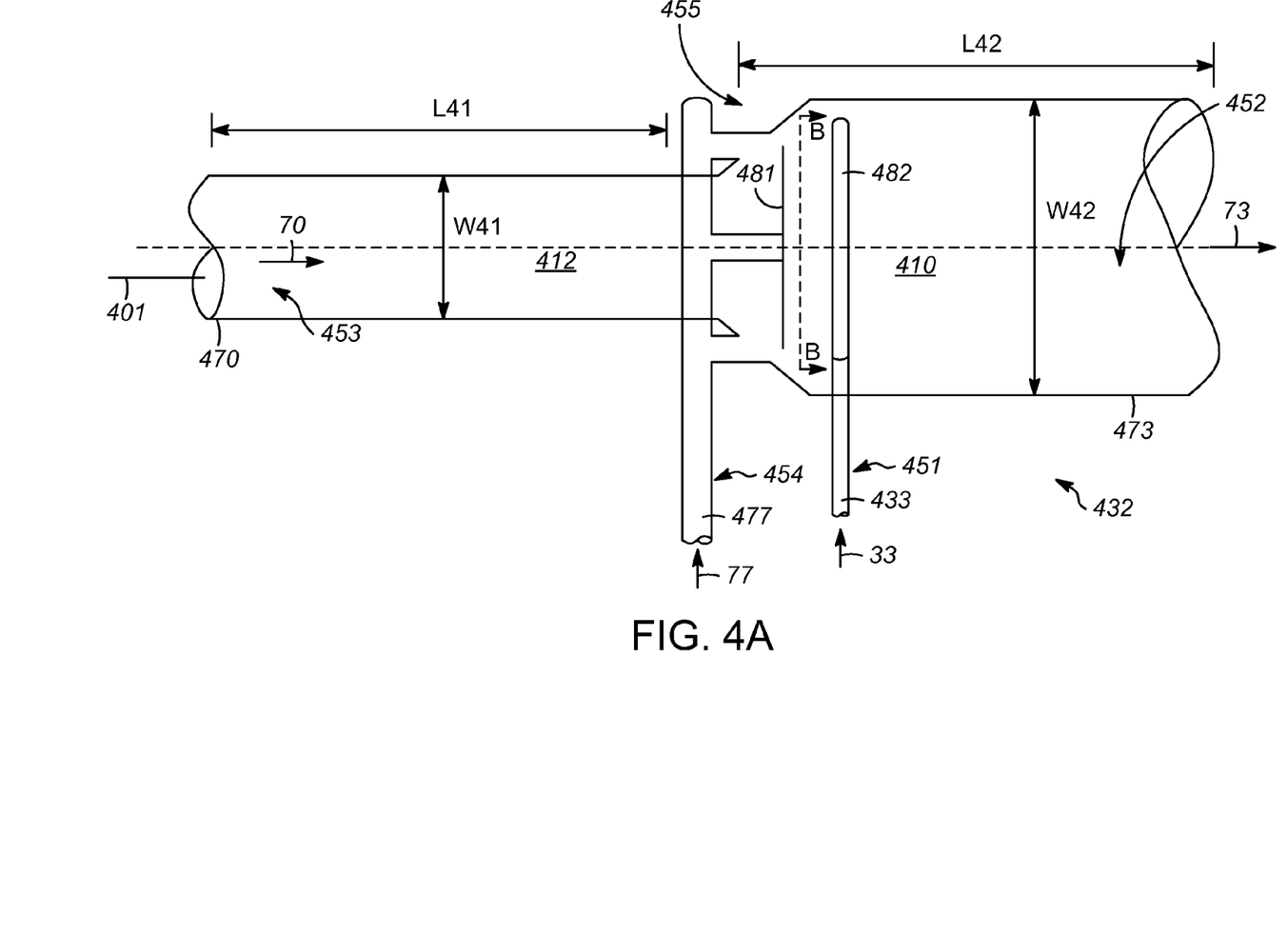
FIGS. 4A-4C provide a further exemplary configuration of a combustor suitable for use in the fluidized catalytic cracking process illustrated in FIG. 1.
Figure 4B:
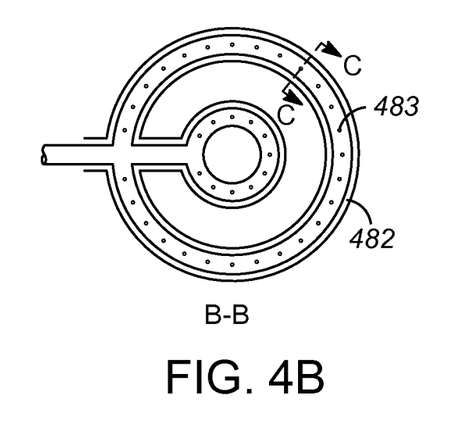
Figure 4C:
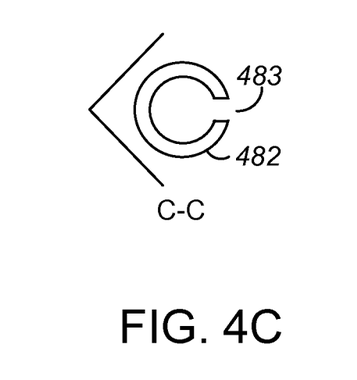

In accordance with yet another exemplary embodiment, as shown in FIG. 4A, a combustor 432 is provided. In this embodiment, combining the hot combustion gas and the flue gas at the third location comprises combining at a third location that is coterminous with the second location. The combustor 432 is configured such the combustor 432 may include a flue gas 412 duct and two separate injections of air and fuel, respectively. At the expansion of the duct diameter 455 (which expands the duct width from a smaller W41 to a larger W42), a ring 454 of air piping surrounds the flue gas duct 412. A number of pipes direct the air from the ring 454 to distribute the combustion air into the mixture. A static mixer (such as a perforated plate 481) may be used to obtain better uniformity of flow. A second ring system 482 injecting the fuel into the ductwork follows. The ring has angular plates to stabilize the flames on the rings. Multiple internal rings (as shown in the cross-section of FIG. 4B) are used to disperse the fuel across the flue gas/air mixture. These rings have multiple holes 483 (best shown in the cross-section of FIG. 4C) for the fuel to be injected into the stream. The distribution of the combustion process will allow for a shorter length of duct for the fluids to mix, allowing this combustor to be closer to the expander. As with the previous embodiments, combustor 432 includes a fuel gas inlet wherein fuel gas 33 enters the combustor 432. The combustor 432 further includes an air inlet 477 wherein air/oxygen 77 enters the combustor 432. A combustion zone 410 extends within the combustor 432. Combustion initiates after the expansion 455 wherein the fuel gas 33 and air 77 are brought together to form combustion gasses. The flue gas 70 enters the combustor 432 through a flue gas inlet 470, which is located at longitudinal position 453 in flue gas duct 412, having length L41. Combustion of the air 77 and the fuel gas 33 occurs along length L41 within the combustion zone 410 to produce combustion gasses, i.e. $CO_2$ and $H_2O$. Combustion zone 410 and flue gas duct 412 may be co-axial, along longitudinal axis 401. The mixture of combustion gasses and the flue gas, now heated via the combustion and referred to herein as a heated flue gas 73, continues longitudinally in the combustion zone 410 along axis 401 until position 452 is reached, at which the heated flue gas 73 exits via outlet 473. In some embodiments, the cross section of the flue gas duct 410 and combustion zone 412 may be rectangular. In this case, the second ring 482 may be a series of straight pipes inside the combustion zone 410.

Turning now to the steam cycle and with reference back to FIG. 1, the saturated steam source 74 is heated with the heated flue gas 73 to produce superheated steam 76. The heating preferably occurs in heat exchange unit 86, which may be a separate unit or may be included as part of the heating unit 32 if no expander is present. The heat exchange unit 86 may include superheating coil 85 and a steam generating coil 87. The superheated steam 76 typically has a pressure of at least about 30 bar, more preferably 40-50 bar. The superheated steam 76 may be introduced into a steam turbine 78 to generate electricity at high Rankine cycle efficiency. The superheated steam 76 may also be used to drive other equipment. The fluid (condensed water) 80 exiting the steam turbine 78 is recycled. Boiler feed water 90 may also heated by flue gas stream 73 in steam generating coil 87 to provide saturated steam 75 to steam drum 83. The steam source 74 is optionally, but not required to be, from the optional catalyst cooler 100 of the regenerator 12. Saturated steam 74 from the catalyst cooler 100 enters steam drum 83. Steam from the steam drum 83 enters the superheating coil 85, producing the superheated steam 76.

The steam turbine 78 may be any suitable turbine. Steam turbine 78 is typically a condensing turbine, but may also be another type of turbine such as a back pressure or extraction turbine. Condensing turbines are well known in the art as devices for converting the thermal energy of steam into mechanical energy.

The heated flue gas 72 is introduced into an expander 82 (generally a hot gas turboexpander) to recover some of the energy of the flue gas as electricity or as mechanical energy. Heated flue gas stream 73 exits the expander 82. In an alternative embodiment (not shown), expander 82 is located downstream of heat exchange unit 86. However, since the heated flue gas 72 may contain some particulate material, the expander 82 may be of a rugged type typically used, for example, in basic steel blast furnace top gas power recovery. Such rugged expanders may be one or more stages of expansion and coupled with electric generator set, air blower or other energy user.

The embodiments of the processes disclosed herein improve the energy efficiency of the FCC and provide for co-generation of electric power at high cycle efficiency. The embodiments may be used with any FCC process, the general conditions of which are well known in the art. The embodiments described herein feature installing a combustion chamber in front of a turbine expander. The supplementary fuel is used to increase the temperature for reaction and additional air is added to combust the fuel and react CO to CO2, as well as to adjust steam generation in the FCC. This combustion chamber can increase the flue gas temperature from the typical range of about 1200 to about 1400° F. (about 650 to about 760° C.) to a new range between about 1600 and about 2500° F. (about 875 to about 1375° C.). The embodiments provided herein also disclose novel combustor designs that are particularly suited for use in front of a turbine expander.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. A co-generation process for a regenerator in a fluidized catalytic cracking (FCC) system having a reactor and a regenerator, the process comprising the steps of:
    introducing flue gas from the regenerator into a heating unit at a first location of the heating unit, and mixing air and fuel gas in the heating unit at a second location of the heating unit apart from the first location to provide an oxygen/fuel gas mixture;
    combusting the oxygen/fuel gas mixture in the heating unit at the second location to form a hot combustion gas;
    combining the hot combustion gas and the flue gas at a third location of the heating unit apart from the first location to produce heated flue gas;
    heating water and/or steam with the heated flue gas to produce a heated steam; and
    introducing the heated steam into a turbine to extract energy from the heated steam.

2. The process of claim 1, wherein introducing the oxygen/fuel gas mixture comprises introducing an air/fuel gas mixture.

3. The process of claim 1, further comprising expanding the heated flue gas prior to the step of heating the water and/or the stream with the heated flue gas.

4. The process of claim 1, wherein combining the hot combustion gas and the flue gas at the third location comprises combining at a third location that is apart from the second location.

5. The process of claim 1, wherein combining the hot combustion gas and the flue gas at the third location comprises combining at a third location that is coterminous with the second location.

6. The process of claim 1, wherein producing the heated flue gas comprises producing a heated flue gas at a temperature of at least about 875° C.

7. The process of claim 1, wherein producing the heated steam comprises producing a heated steam at a pressure of at least about 2.75 MPa.

8. The process of claim 1, wherein introducing flue gas at the first location comprises annularly introducing the flue gas about the second location.

9. The process of claim 1, wherein the fuel gas is derived from one or more of: natural gas, FCC dry gas, LPG, compressed PSA tail gas, and refinery fuel gas.

10. The process of claim 1, wherein extracting energy from the heated steam comprises extracting electrical energy or mechanical energy.

11. A co-generation apparatus for a regenerator in a fluidized catalytic cracking (FCC) system having a reactor and a regenerator, the apparatus comprising:
a heating unit, in fluid communication with flue gas from the regenerator, that comprises first, second, and third locations, wherein the second and third locations are positioned apart from the first location, wherein the heating unit receives a flue gas from the regenerator at the first location, air and fuel gas is mixed in in the heating unit at the second location to provide an oxygen/fuel gas mixture which, when combusted forms a hot combustion gas, and wherein the heating unit combines the flue gas and the hot combustion gas at the third location to form a heated flue gas;
a water or steam source;
a heat exchanger in fluid communication with the heating unit and the water or steam source that heats the water or steam source with the heated flue gas stream to form a heated steam; and
a steam turbine in fluid communication with the heated steam from the heat exchanger, wherein the steam turbine is configured to generate energy upon entry of the heated steam therein.

12. The apparatus of claim 11, wherein the second location is positioned apart from the third location.

13. The apparatus of claim 11, wherein the second location is position coterminous with the third location.

14. The apparatus of claim 11, wherein the heating unit is configured in a substantially Y-shaped configuration comprising first, second, and third ends, and wherein the first location is positioned at the first end, the second location is positioned at the second end, and the third location is positioned at the third end.

15. The apparatus of claim 11, wherein the heating unit is substantially cylindrical or rectangular in configuration and comprises a first diameter and a second diameter that is greater than the first diameter, and a transition region between the first and second diameters, and wherein the first location is positioned in the first diameter, the second location is positioned in the transition region, and the third location is positioned in the second diameter.

16. The apparatus of claim 11, wherein the heating unit is substantially cylindrical or rectangular in configuration, and wherein the first location is positioned about the second location.

17. The apparatus of claim 11, further comprising an expander positioned between the heating unit and the heat exchanger and in fluid communication with both the heating unit and the heat exchanger for expanding the heated flue gas.

18. The apparatus of claim 11, wherein the steam turbine is configured to generate mechanical or electrical energy.

19. The apparatus of claim 11, wherein the fuel gas is derived from one or more of: natural gas, FCC dry gas, LPG, compressed PSA tail gas, and refinery fuel gas.

20. A co-generation process for a regenerator in a fluidized catalytic cracking (FCC) system having a reactor and a regenerator, the process comprising the steps of:
introducing flue gas from the regenerator into a combustion unit at a first location of the combustion unit, and mixing air and fuel gas in the combustion unit at a second location of the combustion unit apart from the first location to provide an air/fuel gas mixture;
combusting the air/fuel gas mixture in the combustion unit at the second location to form a hot combustion gas;
combining the hot combustion gas and the flue gas at a third location of the combustion unit apart from the first location to produce heated flue gas at a temperature of at least about 875° C.;
expanding the heated flue gas in an expander to form an expanded, heated flue gas, wherein the expander generates electrical energy;
heating water or steam with the expanded, heated flue gas to produce a heated steam at a pressure of at least about 2.75 MPa; and
introducing the heated steam into a turbine to extract energy in the form of mechanical or electrical energy from the heated steam.

* * * * *